United States Patent
Honma

(10) Patent No.: US 8,291,803 B2
(45) Date of Patent: Oct. 23, 2012

(54) OPTICAL FIBER CUTTING DEVICE

(75) Inventor: Toshihiko Honma, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/987,765

(22) Filed: Jan. 10, 2011

(65) Prior Publication Data

US 2011/0100190 A1 May 5, 2011

Related U.S. Application Data

(62) Division of application No. 12/010,237, filed on Jan. 23, 2008.

(30) Foreign Application Priority Data

Jan. 23, 2007 (JP) ............................... P.2007-013025
Aug. 6, 2007 (JP) ............................... P.2007-204172

(51) Int. Cl.
*B26D 1/18* (2006.01)
*B26D 3/08* (2006.01)
(52) U.S. Cl. ................. 83/651; 83/469; 83/613; 225/93
(58) Field of Classification Search ............. 83/651, 83/879, 375, 746, 452, 469, 613, 614, 663; 225/93–95, 96.5
See application file for complete search history.

(56) References Cited

U.S. PATENT DOCUMENTS

2004/0035004 A1 2/2004 Wilhelm et al.
2006/0201986 A1 9/2006 Sasaki et al.

FOREIGN PATENT DOCUMENTS

| JP | 62-57204 | 3/1987 |
|---|---|---|
| JP | 62-57204 U | 4/1987 |
| JP | 4-276704 | 10/1992 |
| JP | 6-186436 | 7/1994 |
| JP | 07-294747 | 11/1995 |
| JP | 2001-198894 | 7/2001 |
| JP | 2001-218325 | 8/2001 |
| JP | 2005-301142 | 10/2005 |
| JP | 2006-251034 | 9/2006 |

OTHER PUBLICATIONS

Japanese Office Action, with English Translation, issued in Japanese Patent Application No. JP 2007-204172 dated on Dec. 24, 2008.
European Search Report issued in European Patent Application No. EP 08001113.3-1234, dated Jul. 1, 2008.

*Primary Examiner* — Phong Nguyen
(74) *Attorney, Agent, or Firm* — McDermott Will & Emery LLP

(57) ABSTRACT

An optical fiber cutting device is configured so that a disk-like blade member is moved in a state, in which the blade member is pushed against a glass fiber part of an optical fiber, to form a flaw on a surface of the glass fiber part. The blade member is turned by a feed roller in synchronization with a movement operation of the blade member that rotates by a contact friction force generated when the blade member is put into contact with a contact member fixedly provided halfway a movement path of the blade member.

5 Claims, 8 Drawing Sheets

FIG. 13A *Prior Art*
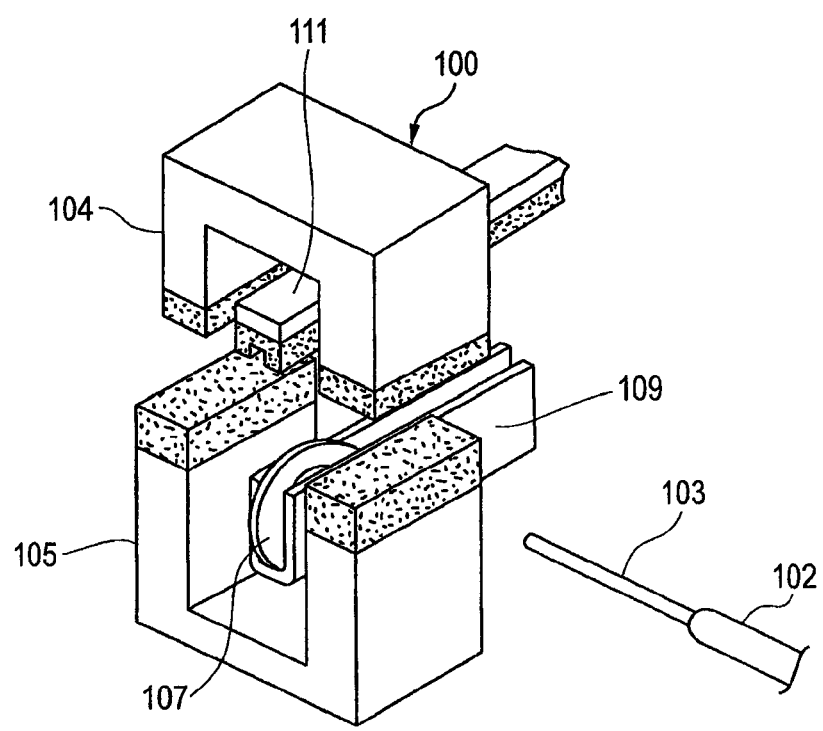
FIG. 13B *Prior Art*
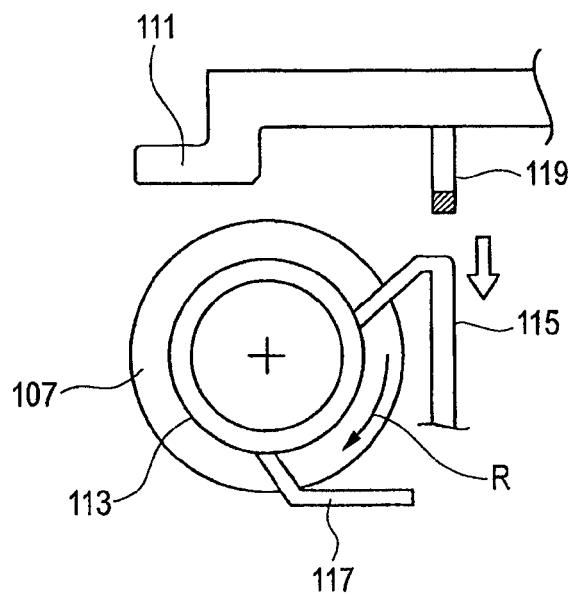

OPTICAL FIBER CUTTING DEVICE

CROSS REFERENCE TO RELATED APPLICATIONS

This application is a Division of application Ser. No. 12/010,237 file on Jan. 23, 2008, which claims priorities to Japanese Patent Application No. 2007-204172, filed Aug. 6, 2007, and Japanese Patent Application No. 2007-013025, filed Jan. 23, 2007 in the Japanese Patent Office, the entire contents of each of which are incorporated by reference.

TECHNICAL FIELD

The present disclosure relates to an optical fiber cutting device for cutting an optical fiber by forming a flaw on a surface of a glass fiber part of an optical fiber with a disk-like blade member.

RELATED ART

A "stress rupture" method is known as a method for cutting a silica-based optical fiber.

This stress rupture method is to first form an initial flaw on a surface of a glass fiber part of an optical fiber by a very hard cutting blade for forming a flaw, which is made of a super-hard alloy or a diamond or the like, and to subsequently apply a bending stress to the glass fiber part so as to cause rupture of the optical fiber, that is, to obtain a mirror surface on a fracture surface of the optical fiber by a cleavage.

According to this method, a mirror surface can quickly be formed without grinding a cutting surface of an optical fiber with a grinding stone or the like. Therefore, this method is effective in connecting many optical cables at worksites and in experimental laboratories.

A device of the type configured to move a disk-like blade member toward a glass fiber part of an optical fiber and to form a flaw on a surface of the glass fiber part has been developed as an optical fiber cutting device for performing this stress rupture method.

However, in a case where the blade member having been repeatedly used becomes blunt in such a device of the type configured to form a flaw on a surface of a glass fiber part of an optical fiber with the blade member, the fracture surface of the optical fiber formed by rupture caused by a cleavage is not favorable mirror surface.

Accordingly, an optical fiber cutting device has been proposed, in which a disk-like blade member is mounted to be able to be freely rotated when a screw for fastening the blade member is loosened, and in which, before the blade member becomes blunt, an operator of the device loosens the blade member and rotates the blade member around the center of a disk-like shape thereof by an appropriate angle to change a contact area between the blade member and the glass fiber part.

However, this related-art device has the following problems. That is, an operation of rotating the blade member so as to change the contact area therebetween is a heavy burden imposed on the operator. Also, the frequency of changing the contact area therebetween varies with the operator. Consequently, it is difficult to properly change the contact area of the blade member with the glass fiber part.

Accordingly, to prevent occurrence of such problems, an optical fiber cutting device illustrated in FIGS. 13A and 13B has been proposed.

This optical fiber cutting device 100 is disclosed in Patent Document described below. The optical fiber cutting device 100 has a pair of upper and lower clamp members 104 and 105, a disk-like blade member 107, a support frame 109, and a block member 111. The upper and lower clamp members 104 and 105 hold a glass fiber part 103 exposed by peeling off the cladding of an optical fiber 102. The disk-like blade member 107 is adapted to move under the glass fiber part 103 fixed by these clamp members 104 and 105 and to form a flaw on an outer peripheral surface of the glass fiber part 103. The support frame 109 rotatably supports the blade member 107. The block member 111 is upwardly and downwardly movably provided above the glass fiber part 103 to apply a bending load onto the top surface of the glass fiber part 103. Upon completion of forming a flaw with the blade member 107 on the glass fiber part 103 fixed by the clamp members 104 and 105, a bending load is applied to the glass fiber part 103 by the block member 111. Consequently, a fracture surface formed due to a cleavage of the optical fiber is obtained.

In the case of the optical fiber cutting device 100, as illustrated in FIG. 13B, a gear 113 is integrally provided on a side surface of the blade member 107. The gear 113 is engaged with a first plate spring 115 for driving the gear and with a second plate spring 117 for preventing the reverse rotation of the gear.

When the block member 111 descends, the first plate spring 115 is pushed down by an operating pin 119 fixedly provided at a base end of the block member 111. The gear 113 is rotated in a direction of arrow R shown in FIG. 13B by a predetermined constant angle. Because the gear 113 is integral with the blade member 107, the blade member 107 turns integrally with the gear 113 by the predetermined constant angle. Consequently, the contact area of the blade member 107 with the glass fiber 103 is changed.

That is, in the optical fiber cutting device 100 illustrated in FIGS. 13A and 13B, the blade member 107 is automatically turned by a predetermined constant angle in synchronization with a descending movement of the block member 111 for causing the cleavage of the glass fiber part 103 on which the flaw is formed. Thus, the contact area of the blade member 107 with the glass fiber part 103 is changed. Accordingly, the contact area of the blade member can be changed without imposing a burden on an operator. Additionally, variation in the frequency of changing the contact area can be reduced.

[Patent Document 1] Japanese Patent Unexamined Publication No. 6-186436

Meanwhile, the contact area of the blade member 107 with the glass fiber part 103 is changed by turning the blade member 107 by a predetermined angle corresponding to, for example, (1/12) of a circumference at a time in the optical fiber cutting device 100. However, in view of the processability and the processing cost of the gear 113 used for turning the blade member 107, there is a lower limit to the predetermined constant angle at which the blade member 107 is turned at a time.

Consequently, in the case of the related-art optical fiber cutting device 100, a length by which that of the contact area is changed at a time, is relatively long. Accordingly, there is a limit to the number of times of changing the contact area of the blade member 107. Therefore, the related-art optical fiber cutting device 100 has a problem that it is difficult to lengthen the lifetime of the blade member 107.

SUMMARY

Exemplary embodiments of the present invention provide an optical fiber cutting device enabled to automatically change the contact area of a blade member with a glass fiber part without imposing a burden onto an operator and to set an amount of rotation, by which the blade member is turned at a time so as to change the contact area, at an optionally small value thereby increasing the lifetime of the blade member.

The present invention is achieved by the following means having configurations described below.

(1) An optical fiber cutting device for cutting an optical fiber comprises a disk-like blade member which forms a flaw on a surface of a glass fiber part of the optical fiber by being moved toward the glass fiber part of the optical fiber. This optical fiber cutting device is featured in that a contact area between the blade member and the glass fiber part is changed by rotating the blade member in synchronization with the movement operation of the blade member.

With the configuration, the blade member is rotated in synchronization with the movement of the blade member. The contact area of the blade member with the glass fiber part is automatically changed.

Accordingly, the contact area of the blade member with the glass fiber part can automatically be changed without imposing a burden on an operator.

(2) An embodiment (hereunder referred to the optical fiber cutting device described in (2)) of the optical fiber cutting device described in (1), further comprises a contact member fixedly provided halfway through a movement path of the blade member. This optical fiber cutting device is featured in that rotation of the blade member is implemented by a contact friction force which is generated by contact between the blade member and the contact member.

(3) An embodiment (hereunder referred to the optical fiber cutting device described in (3)) of the optical fiber cutting device described in (2), which is featured in that the blade member includes a feed roller for receiving the contact friction force, and a one-way clutch for transmitting torque of the feed roller to the blade member only duration rotation in one direction of the feed roller.

Thus, during the movement operation of the blade member, the contact member is brought into contact with the feed roller on a forward pathway and a backward pathway. However, due to the provision of the one-way clutch, the blade member is rotated on only one of the forward pathway and the backward pathway. Therefore, even in a case where the direction of the contact friction force acting between the contact member and the feed roller on the forward pathway is opposite to that of the contact friction force on the backward pathway, the rotation of the blade member is not reversed. Consequently, the blade member can appropriately be rotated in one direction.

Additionally, according to the selection of the operating direction of the one-way clutch, it can be determined which of the forward pathway and the backward pathway, on which the blade member is rotated.

(4) An embodiment (hereunder referred to the optical fiber cutting device described in (4)) of the optical fiber cutting device described in (3), further comprises a position adjusting mechanism which adjusts contact friction between the feed roller and the contact member. This optical fiber cutting device is featured in that the contact member is fixed through the position adjusting mechanism, and an amount of rotation of the blade member is changed by adjusting the position adjusting mechanism.

With this configuration, an amount of rotation of the blade member for changing the contact area can be set at an optional value by adjusting the contact friction using the position adjusting mechanism. Consequently, the maximum number of times of changing the contact area of the blade member can be increased. Accordingly, the lifetime of the blade member can be lengthened.

(5) An embodiment (hereunder referred to the optical fiber cutting device described in (5)) of the optical fiber cutting device described in (4), which is featured in that the position adjusting mechanism is enabled to adjust a position of the contact member in three directions including a direction of an axis of rotation of the disk-like blade member, a direction of a movement operation of the blade member, which is perpendicular to the axis of rotation of the blade member, and a direction perpendicular to both of the axis of rotation of the blade member and the direction of movement of the blade member.

With such a configuration, the contact width between the contact member and the feed roller can be adjusted to an optical value by performing the adjustment of the position of a contact member in the direction of an axis of rotation of the blade member. Further, the contact length between the contact member and the feed roller can be adjusted to an optical value by performing the position of the contact member in the direction of movement of the blade member, which is perpendicular to the axis of rotation of the blade member. The contact pressure between the contact member and the feed roller can be adjusted to an optical value by performing the adjustment of the position of the contact member in a direction perpendicular to both of the direction of rotation of the blade member and the direction of movement of the blade member. Combinations of the adjustments respectively corresponding to these three directions by the position adjusting mechanism enable an increase in a range, in which the contact friction force acting between the contact member and the feed roller is adjusted, and the fine adjustment of the contact friction force. Also, the adjustment of the amount of rotation of the blade member can be achieved with higher precision. Additionally, the contact friction force reduced by abrasion of the contact member can be restored.

(6) An embodiment (hereunder referred to the optical fiber cutting device described in (6)) of the optical fiber cutting device described in (1), further comprises an arm member fixedly provided halfway through a movement path of the blade member. This optical fiber cutting device is featured in that the blade member includes a gear, and that rotation of the blade member is implemented by contact between an arm member fixedly provided halfway through a movement path and the gear.

(7) An embodiment (hereunder referred to the optical fiber cutting device described in (7)) of the optical fiber cutting device described in (6), which is featured in that the arm member includes an elastic member.

Thus, during the movement operation of the blade member, the arm member can be put into contact or elastic contact with the gear. Consequently, the blade member can surely be rotated.

(8) An embodiment (hereunder referred to the optical fiber cutting device described in (8)) of the optical fiber cutting device described in (6) or (7), which is featured in that the arm member is fixed through the position adjusting mechanism.

With this configuration, the contact pressure or the contact length between the arm member and the gear can be adjusted to an optical value, using the position adjusting mechanism. The amount of rotation of the blade member can surely be adjusted with high precision.

(9) An embodiment (hereunder referred to the optical fiber cutting device described in (9)) of the optical fiber cutting device described in one of (1) to (8), further comprises a cleaning means provided halfway through a movement path of the blade member.

Thus, even when chips generated at the formation of a flaw on the glass fiber part adhere to the blade member, the chips having adhered to the blade member can be removed by a cleaning operation of the cleaning means before the next operation of forming a flaw thereon. Consequently, the chips having been left on the blade member does not affect the next operation of forming a flaw thereon.

(10) An embodiment (hereunder referred to the optical fiber cutting device described in (10)) of the optical fiber cutting device described in one of (1) to (9), which is featured in that the blade member reciprocates, that the blade member rotates on a forward pathway, and that the blade member forms a flaw on the glass fiber part on a backward pathway.

With this configuration, the contact area of the blade member with the glass fiber part is changed just before each operation of forming a flaw thereon. Consequently, a flaw can be formed by a sharp-edged blade member.

(11) An embodiment of the optical fiber cutting device described in one of (1) to (10), which is featured in that the blade member includes a mark visibly checking a rotating state of the blade member.

With this configuration, a mark provided on the blade member is moved when the blade member is rotated in synchronization with the movement operation of the blade member. Thus, it can easily and visually been checked whether the contact area is properly changed by the rotation of the blade member. This facilitates the adjustment of the amount of rotation of the blade member in synchronization with the movement operation of the blade member.

According to the optical fiber cutting device of the present invention, the contact area of the blade member with the glass fiber part is automatically changed by the rotation of the blade member in synchronization with the movement operation of the blade member.

Accordingly, the contact area of the blade member with the glass fiber part can automatically be changed without imposing a burden on an operator.

Other features and advantages may be apparent from the following detailed description, the accompanying drawings and the claims.

BRIEF DESCRIPTION OF THE DRAWINGS

FIG. 13A is a perspective view of a primary part of a related-art optical fiber cutting device. FIG. 13B is an explanatory view illustrating a mechanism for changing the contact area by rotating the blade member.

DETAILED DESCRIPTION

Hereinafter, preferred embodiments of an optical fiber cutting device according to the present invention are described in detail with reference to the accompanying drawings.

Figure 1:
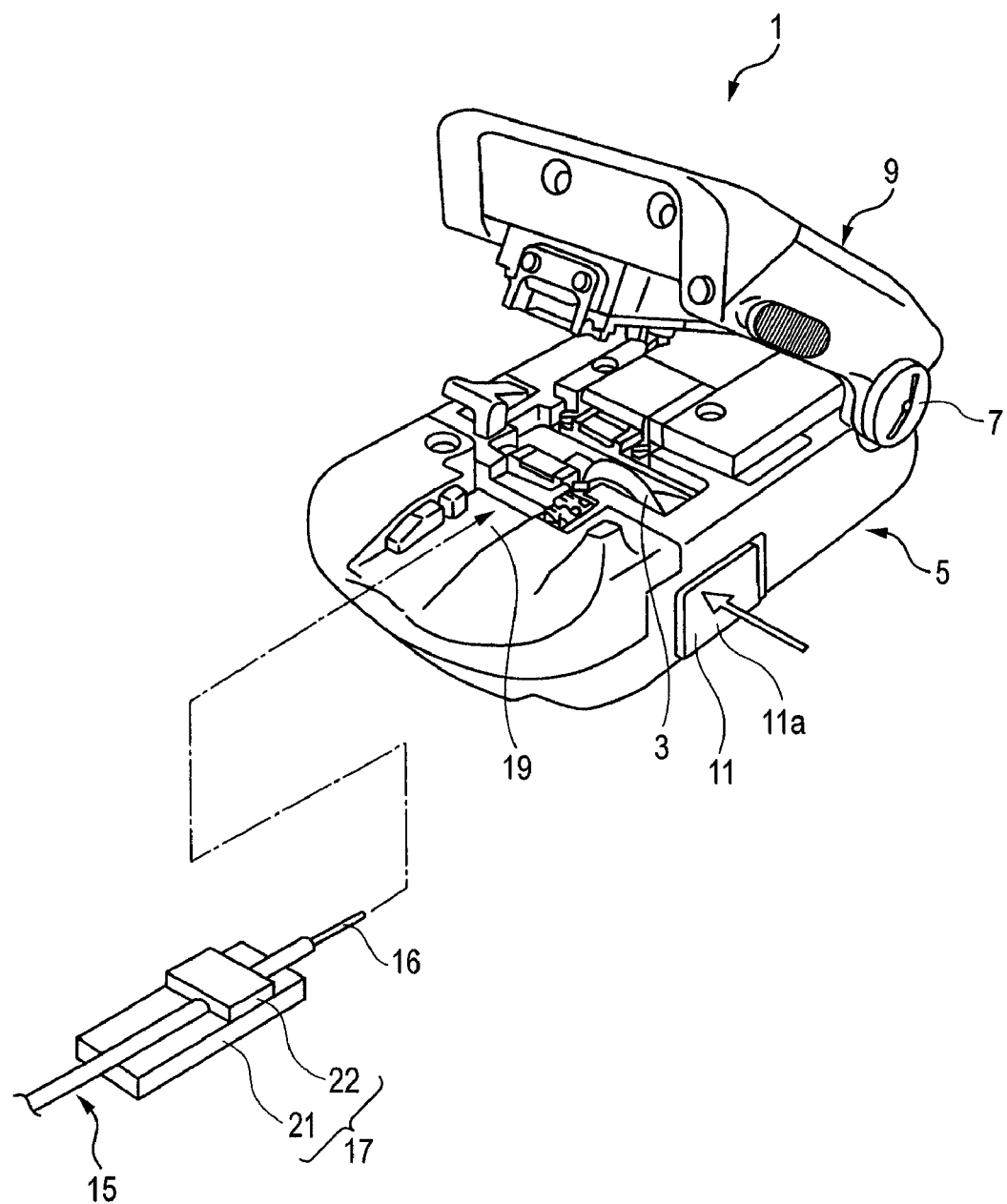
FIG. 1 is a perspective view schematically illustrating a first embodiment of an optical fiber cutting device according to the present invention.
Figure 2:
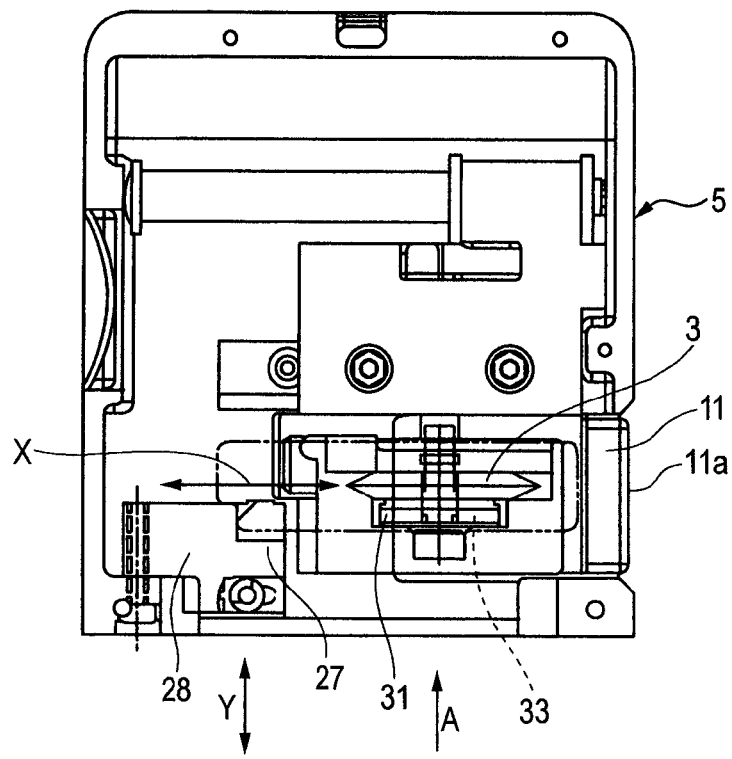
FIG. 2 is a plan view illustrating a body of the optical fiber cutting device illustrated in FIG. 1.
Figure 3:
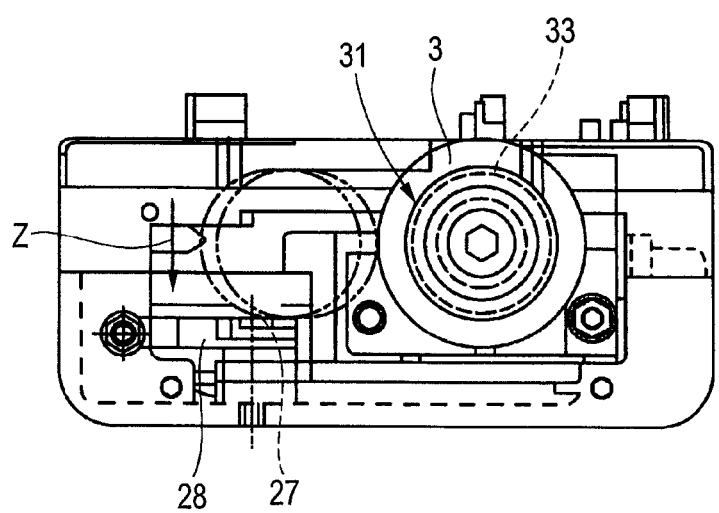
FIG. 3 is a view taken in the direction of arrow A shown in FIG. 2.

FIG. 1 is a perspective view schematically illustrating an external appearance of a first embodiment of an optical fiber cutting device according to the present invention. FIG. 2 is a plan view illustrating a body of the optical fiber cutting device illustrated in FIG. 1. FIG. 3 is a view taken in the direction of arrow A shown in FIG. 2. FIGS. 4A to 4D are explanatory views illustrating an operation of forming a flaw in a glass fiber part with the blade member shown in FIG. 3.

As illustrated in FIG. 1, an optical fiber cutting device 1 includes a lower casing 5 which has a disk-like blade member 3, and an upper casing 9 turnably connected to an end of the lower casing 5 through a hinge member 7.

As illustrated in FIG. 1, a fiber mounting portion 19 for positioning a fiber holder 17, which holds an optical fiber 15, is provided on the top surface of the lower casing 5.

The fiber holder 17 has a base 21 for supporting the fiber holder 17 from below, and a pressing plate 22 for pressing the optical fiber 15 against the base 21.

The fiber mounting portion 19 performs the positioning of the fiber holder 17 so that a glass fiber part 16 exposed at an end of the optical fiber 15 held by the fiber holder 17 crosses a movement path (i.e., a path indicated by arrow X shown in FIG. 2) of the blade member 3 above the lower casing 5.

Figure 4A:
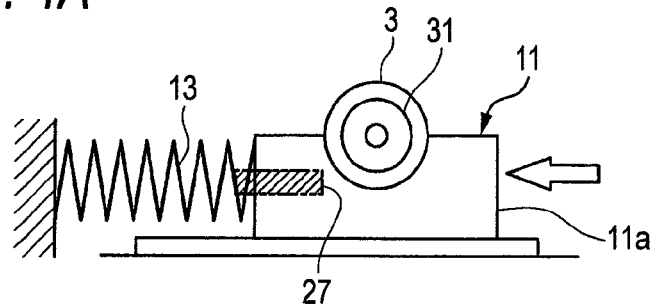
FIGS. 4A to 4D are explanatory views illustrating an operation of forming a flaw in a glass fiber part with a blade member.

A support frame 11 rotatably supporting the disk-like blade member 3 is supported movably in a direction indicated by arrow X shown in FIG. 2. As illustrated in FIG. 4A, when an end surface 11a of the support frame 11, which is exposed to a side surface of the lower casing 5, is pressed, this support frame 11 is slide-moved along a direction in which the end surface 11a is pressed. The blade member 3 is moved integrally with the support frame 11.

As illustrated in FIGS. 4A to 4D, a spring member 13 for pressing the support frame 11 in a direction, in which the support frame 11 is pushed back, is provided at the opposite side of the support frame 11.

Figure 4B:
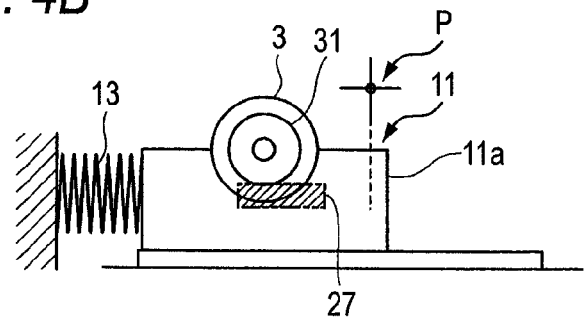

As illustrated in FIG. 4B, when the support frame 11 is pushed and slide-moved so that the blade member 3 moves over a flaw formation position P (i.e., a position at which the blade member 3 is brought into contact with the glass fiber part 16 in the optical fiber and forms a flaw, as will be described later), the support frame 11 is engaged with a catching member (not shown) provided in the lower casing 5 and is fixed at this position.

Figure 4C:
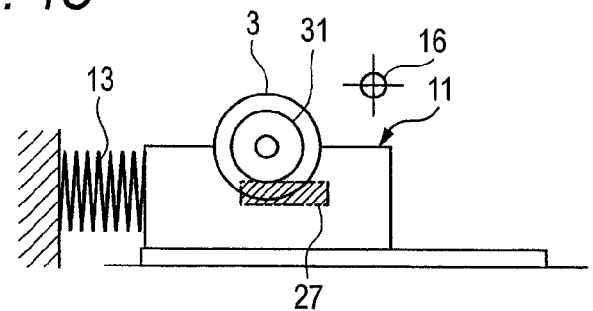

After the blade member 3 moves over the flaw formation position P and is fixed, as illustrated in FIG. 4B, the fiber holder 17 holding the optical fiber 15 is set at the fiber mounting portion 19, as illustrated in FIG. 4C. Consequently, the glass fiber part 16 is positioned at the flaw formation position P.

When in a position illustrated in FIG. 4C the upper casing 9 is closed (i.e., the upper casing 9 is turned to the lower casing 5 and is pushed against the top surface of the lower casing 5), an engagement releasing piece (not shown) provided on the upper casing 9 cancels the engagement between the support frame 11 and the catching mechanism. Consequently, the support frame 11 is return-moved at a stroke to an initial position by a pushing force of the spring member 13. This movement operation of the blade member 3 at that time causes that a cutting blade of the blade member 3 is put into contact with the glass fiber part 16 and forms a flaw on the glass fiber part 16.

In the case of the optical fiber cutting device 1 according to the present embodiment, the blade member 3 is rotated in synchronization with the movement operation of the blade member 3 for forming a flaw. Consequently, the contact area of the blade member 3 with the glass fiber part 6 is changed.

A mechanism for rotating the blade member 3 in synchronization with the movement operation of the blade member 3 is constituted as described below.

The rotation of the blade member 3 in synchronization with the movement thereof is implemented by a contact friction force that is generated by the contact between the blade member 3 and the contact member 27, which is fixedly provided halfway the movement path of the blade member 3, during the movement operation of the blade member 3 for forming a flaw.

The contact member 27 is made of a rubber material having a large friction coefficient and is fixed to a body of the lower casing 5 through a position adjustment mechanism 28 provided halfway through the movement path of the blade member 3.

As illustrated in FIGS. 2 and 3, the blade member 3 includes a feed roller 31 configured to rotate by being put into contact with the contact member 27 and receiving a contact friction force, and also includes a one-way clutch 33 configured to transmit, only when the feed roller 31 rotates in a specific direction, torque of the feed roller 31 to the blade member 3 thereby to cause the blade member 3 to rotate.

In the case of the present embodiment, the one-way clutch 33 is incorporated in an inner peripheral portion of the feed roller 31. An output shaft of the one-way clutch 33 is fixed to the central axis of the blade member 3.

The position adjusting mechanism 28 is a plate member having a top surface to which the contact member 27 is fixed. The positioning adjusting mechanism 28 is attached to the body of the lower casing 5 to be able to achieve position adjustment in three directions that include a direction of the rotation axis of the disk-like blade member 3 (i.e., Y-direction shown in FIG. 2), a direction of movement of the blade member 3, which is perpendicular to the rotation axis of the blade member 3 (i.e., X-direction shown in FIG. 2), and a direction perpendicular to both of the rotation axis of the blade member 3 and a direction of movement of the blade member 3. A position of the contact member 27, at which the contact member 27 is in contact with the feed roller 31, in each of the three directions, that is, X-direction, Y-direction, and Z-direction is adjusted by causing the position adjusting mechanism 28 to perform position adjustment in these three directions.

The contact area between the feed roller 31 and the contact member 27 and the contact pressure acting therebetween are changed by adjusting position of the contact member 27, at which the contact member 27 is in contact with the feed roller 31. Consequently, the magnitude of the contact friction between the feed roller 31 and the contact member 27 can be adjusted.

In the case of the present embodiment, as illustrated in FIGS. 4A to 4D, a position, at which the contact member 27 is provided, is set at a predetermined distance from the flaw formation position P in a direction in which the blade member 3 is moved. Therefore, the rotation of the blade member 3 due to the contact friction between the contact member 27 and the blade member 3 can be performed at a position deviated from the flaw formation position P after the support frame 11 is pressed so that the feed roller 31 passes through the flaw formation position P.

Figure 4D:
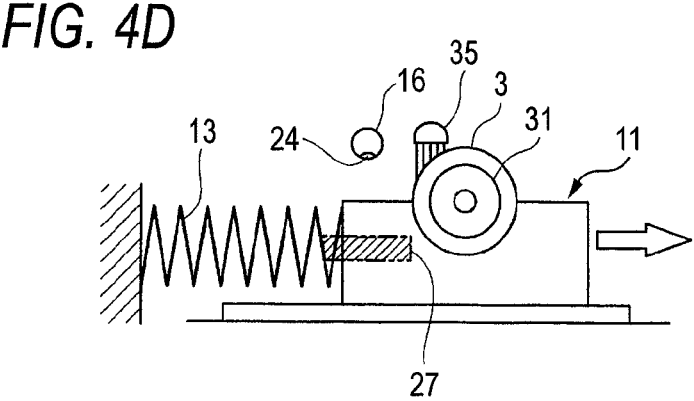

Then, in the case of the optical fiber cutting device 1 according to the present embodiment, as illustrated in FIG. 4D, a cleaning means 35 for cleaning a surface of the blade member 3 is provided halfway the movement path on the backward pathway of the blade member 3 so as to be in contact with the blade member 3.

The cleaning means 35 is mounted in the upper casing 9. When the upper casing 9 is closed, the cleaning means 35 is protruded into the movement path of the blade member 3. Also, the surface of the blade member 3 is wiped out by the contact between the blade member 3 and the bristles of brush (or nonwoven cloth) of the cleaning means 35.

In the case of the above-described optical fiber cutting device 1, the blade member 3 is rotated in synchronization with the movement operation of the blade member 3 for forming a flaw 24 on the glass fiber part 16. Thus, the contact area between the blade member 3 and the glass fiber part 16 is automatically changed.

Therefore, the contact area of the blade member 3 with the glass fiber part 16 can automatically be changed without imposing a burden on an operator.

Further, in the case of the optical fiber cutting device 1 according to the present embodiment, the rotation of the blade member 3 is implemented by a contact friction force which is generated by the contact between the blade member 3 and the contact member 27 fixedly provided halfway through the movement path of the blade member 3.

The blade member 3 includes the feed roller 31 for receiving the contact friction force, and the one-way clutch 33 for transmitting torque of the feed roller 31 to the blade member 3 only duration rotation in one direction of the feed roller 31.

Thus, during the movement operation of the blade member 3 for forming a flaw 24 on the glass fiber part 16, the contact member 27 is brought into contact with the feed roller 31 on the forward pathway and the backward pathway. However, due to the provision of the one-way clutch 33, the blade member 3 is rotated on only one of the forward pathway and the backward pathway. Therefore, even in a case where the direction of the contact friction force acting between the contact member 27 and the feed roller 31 on the forward pathway is opposite to that of the contact friction force on the backward pathway, the rotation of the blade member 3 is not reversed. Consequently, the blade member 3 can appropriately be rotated in one direction.

Additionally, according to the selection of the operating direction of the one-way clutch 33, it can be determined which of the forward pathway and the backward pathway, on which the blade member 3 is rotated.

In the aforementioned embodiment, the blade member 3 is rotated on the forward pathway. Consequently, the rotation of the blade member 3 is surely performed due to the contact friction between the contact member 27 and the feed roller 31. However, the blade member 3 may be adapted to rotate when the blade member 13 is return-moved on the backward pathway thereof due to a pushing force of the spring member 13. With this configuration, to surely obtain a contact friction force even when the feed roller 31 is return-moved at a stroke due to a pushing force of a spring, preferably, the contact member 27 applies an elastic force to the feed roller 31 by a plate spring or the like.

Also, in the optical fiber cutting device 1 according to the present embodiment, the contact member 27 is fixed halfway the movement path of the blade member 3 through the position adjusting mechanism 28 for adjusting the contact friction between the contact member 27 and the feed roller 31. An amount of rotation of the blade member 3 can be adjusted to a small amount by using the position adjusting mechanism 28 to adjust the magnitude of the contact friction to a small value.

Consequently, the maximum number of times of changing the contact area of the blade member 3 can be increased. Accordingly, the lifetime of the blade member 3 can be lengthened.

Further, the optical fiber cutting device 1 according to the present embodiment, the position adjusting mechanism 28 is enabled to adjust a position of the contact member 27 in three directions including the direction of an axis of rotation of the blade member 3 (i.e., Y-direction shown in FIG. 2), a direction of movement (i.e., X-direction shown in FIG. 2) of the blade member 3, which is perpendicular to the axis of rotation of the blade member 3, and a direction (i.e., Z-direction shown in FIG. 3) perpendicular to both of the axis of rotation of the blade member 3 and the direction of movement of the blade member 3.

Thus, the contact width between the contact member 27 and the feed roller 31 can be adjusted to an optical value by performing the adjustment of the position of the contact member 27 in the direction of an axis of rotation of the blade member 3. Further, the contact length between the contact member 27 and the feed roller 31 can be adjusted to an optical value by performing the position of the contact member 27 in the direction of movement of the blade member 3, which is perpendicular to the axis of rotation of the blade member 3. The contact pressure between the contact member 27 and the feed roller 31 can be adjusted to an optical value by performing the adjustment of the position of the contact member 27 in a direction perpendicular to both of the direction of rotation of the blade member 3 and the direction of movement of the blade member 3. Combinations of the adjustments respectively corresponding to these three directions by the position adjusting mechanism 28 enable an increase in a range, in which the contact friction force acting between the contact member 27 and the feed roller 31 is adjusted, and the fine adjustment of the contact friction force. For example, the amount of rotation of the blade member 3 for a change of the contact area of the blade member 3 is set to the minimum so as to improve the lifetime of the blade member 3. Additionally, the contact friction force reduced by abrasion of the contact member 27 can be restored.

Incidentally, in view of the blade length which contacts the glass fiber part 16 and the lifetime of the blade member 3, it is advisable to set a favorable amount of rotation at a change of the contact area of the blade member 3 at an appropriate value that is within a range from 5 degrees to 35 degrees. Thus, in the case of regulating the amount of rotation of the blade member 3 at a change of the contact area of the blade member 3, the length of the contact area to be changed at a time is not excessive. Consequently, it is necessary to perform change of the contact area the number of times, which ranges from 10 to 72. Therefore, the lifetime of the blade member can surely be lengthened by changing the contact area by the rotation thereof.

More specifically, in a case where the amount of rotation of the blade member at one change is set at 15 degrees, it is possible to change the contact area 24 times. Consequently, the lifetime of the blade member 3 can be increased by simultaneously maintaining the blade member 3 to be favorably sharp.

Further, in the optical fiber cutting device 1 according to the present embodiment, the rotation of the blade member 3 due to the contact friction between the contact member 27 and the blade member 3 can be performed at a position deviated from the flaw formation position P.

Thus, the contact between the blade member 3 and the glass fiber part 16 at the flaw formation position P is performed in a state in which the blade member 3 is rest. Consequently, a flaw can be formed with high precision. Also, the damage of the blade member 3 can be reduced.

Additionally, in the optical fiber cutting device 1 according to the present embodiment, as illustrated in FIG. 4D, the cleaning means 35 for cleaning a surface of the blade member 3 is provided halfway the movement path of the blade member 3 so as to be in contact with the blade member 3.

Accordingly, even when chips generated at the formation of a flaw on the glass fiber part 16 adhere to the blade member 3, the chips having adhered to the blade member 3 can be removed by a cleaning operation of the cleaning means 35 before the next operation of forming a flaw thereon. Consequently, the chips having been left on the blade member 3 does not affect the next operation of forming a flaw thereon.

Figure 5:
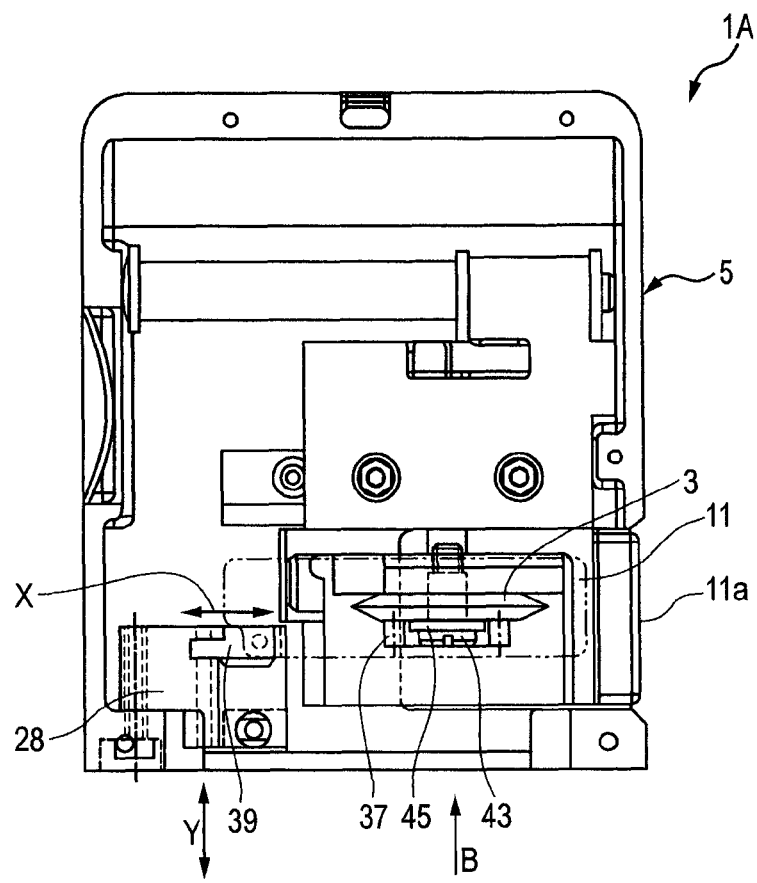
FIG. 5 is a plan view illustrating a body of a second embodiment of the optical fiber cutting device according to the present invention.
Figure 6:
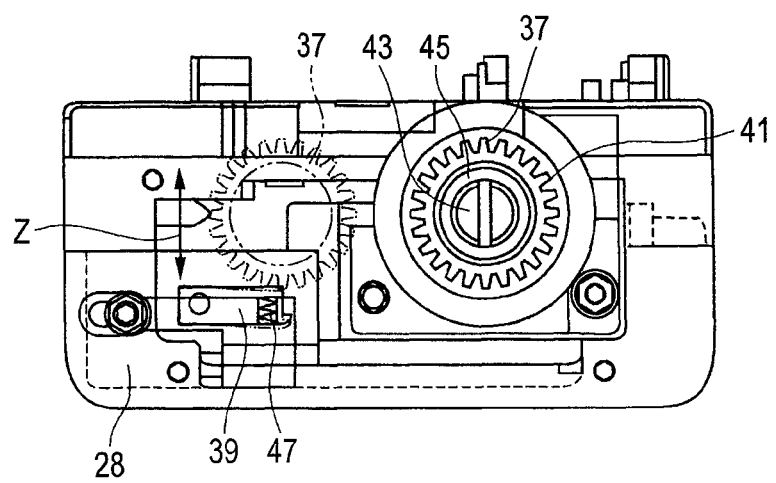
FIG. 6 is a view taken in the direction of arrow B shown in FIG. 5.

Next, a second embodiment of the optical fiber cutting device according to the present invention is described below. FIG. 5 is a plan view illustrating a body of a second embodiment of the optical fiber cutting device according to the present invention. FIG. 6 is a view taken in the direction of arrow B shown in FIG. 5.

An optical fiber cutting device 1A according to the second embodiment is similar to the first embodiment except for a mechanism for rotating the blade member 3 in synchronization with the movement thereof. Like reference numerals designate like parts and places of the first embodiment. The description thereof is omitted.

According to the second embodiment, the rotation of the blade member 3 is implemented in synchronization with the movement thereof, using a gear 37 provided integrally with the blade member 3 and also using an arm member 39 fixedly provided halfway the movement path of the blade member 3 to be brought into surface contact with the gear 37.

The gear 37 is configured so that concave and convex teeth are continuously formed in a circumferential direction on a ring-like outer peripheral surface. The gear 37 is integrated with the blade member 3 by fitting a projection portion (not shown) protruded from a surface of the gear 37, which faces the blade member 3, into a hole (not shown) formed in an associated surface of the blade member 3.

The blade member 3 formed integrally with the gear 37 is rotatably mounted in the support frame 11 by a screw 43 passing through the center of the blade member 3. A disk spring 45 is intervened between the gear 37 and the screw 43. The blade member 3 is mounted therein by being pushed against the support frame 11 by a pushing force of the disk spring 45, which ranges from 1 kgf to 3 kgf. The mounting accuracy of the blade member 3 is assured by this pushing force. However, in a case where the pushing force becomes too high by tightly fastening the screw 43, the blade member 3 becomes difficult to rotate. Conversely, in the case of too loosely fastening the screw 43, the blade member 3 easily rotates. Therefore, the magnitude of the pushing force is determined to be within the aforementioned range.

The arm member 39 is placed on the position adjusting mechanism 28 so that an end of the arm member 39 is swingably mounted on the position adjusting mechanism 28, and that the other end of the arm member 39 is supported swingably in a direction, in which the latter end of the arm member 39 moves closer to the position adjusting mechanism 28, or in a direction, in which the latter end of the arm member 39 departs from the position adjusting mechanism 28.

The arm member 39 is pushed by a 78 gf to 100 gf spring load of a compression spring 47 interposed between the arm member 39 and the position adjusting mechanism 28 so that the arm member 39 can be put into elastic contact with the gear 37.

At that time, the pushing force of the compression spring 47 is set at a magnitude at which the gear 37 is rotated on the forward pathway at the movement operation of the blade member 3 by simultaneously being in contact with the arm member 39 and in which when the crests of the teeth 41 of the gear 37 having been rotated are brought into contact with the arm member 39 and depresses the arm member 39 to a maximum (i.e., the compression spring 47 is compressed to a maximum), the rotation of the gear 37 is suppressed. Also, a state, in which the gear 37 does not rotate, is maintained during the blade member 3 moves on the backward pathway thereof. Consequently, a flaw is formed on the glass fiber part by the contact area of the blade member 3, which has been changed when the blade member 3 moves on the forward pathway thereof. Incidentally, the rotation of the gear 37 cannot surely be suppressed only by the pushing force of the compression spring 47. Accordingly, it is advisable to control the rotation of the gear 37 by simultaneously adjusting the pushing force against the support frame 11 of the glade member 3.

Incidentally, the amount of rotation of the blade member 3 can be changed according to the gear 37 by changing the pitch of the convex and concave teeth 41 thereof. Alternatively, the amount of rotation of the blade member 3 can be changed by setting the pitch of the teeth 41 of the single gear 37 to be nonuniformly changed.

Similarly to the first embodiment, in this case, the amount of rotation at a change of the contact area of the blade member 3 is set at an appropriate value that is within a range from 5 degrees to 35 degrees. Thus, the length of the contact area to be changed at a time is not excessive. Consequently, a sufficiently large number can be set as the maximum number of times of changing the contact area of the blade member. Accordingly, the lifetime of the blade member can be lengthened.

In the aforementioned optical fiber cutting device 1A, the simplification of the structure of the device and the reduction in the manufacturing cost thereof can be achieved by omitting the one-way clutch used in the first embodiment.

Also, in the case of the optical fiber cutting device 1A according to the second embodiment, the rotation of the blade member 3 can be implemented by the contact or elastic contact between the gear 37, which is formed integrally with the blade member 3, and the arm member 39 fixedly provided halfway the movement path of the blade member 3. Consequently, the blade member 3 can surely be rotated.

Additionally, in each of the aforementioned embodiments, the blade member 3 rotates on the forward pathway at the movement thereof. Then, during the blade member 3 moves on the backward pathway, a flaw is formed on the surface of the glass fiber part by the changed contact area thereof. Thus, the contact area of the blade member 3 is changed just before each operation of forming a flaw on the surface of the glass fiber part. Consequently, a flaw can be formed by a sharp-edged blade member.

Incidentally, a specific structure for fixing the gear 37 to the blade member 3, which has been described in the description of the second embodiment, is not limited to the structure described in the description of the second embodiment.

Hereinafter, third to fifth embodiments obtained by improving a specific structure for fixing the gear 37 to the blade member 3, which has been described in the description of the second embodiment, are serially described below.

Figure 7:
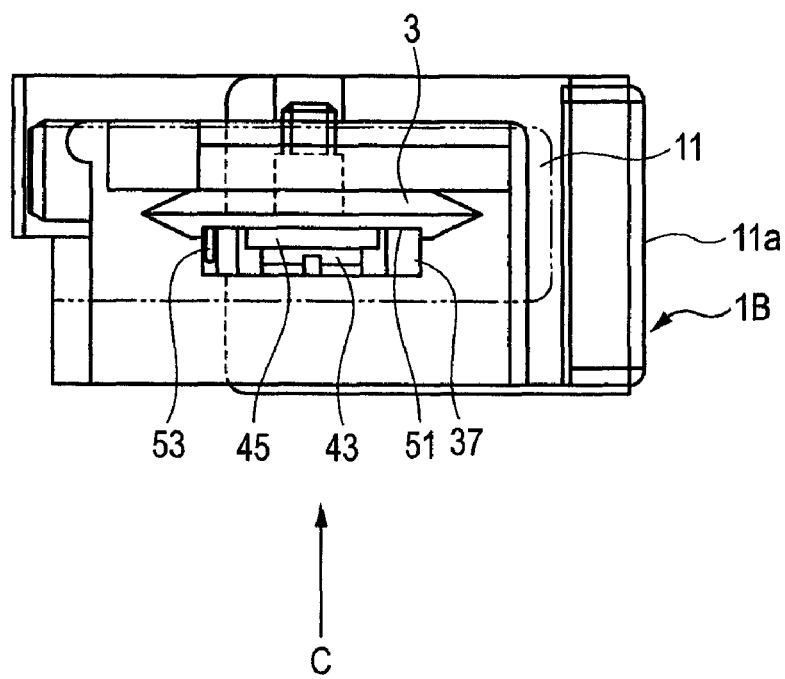
FIG. 7 is a plan view illustrating a primary part of a body of a third embodiment of the optical fiber cutting device according to the present invention.
Figure 8:
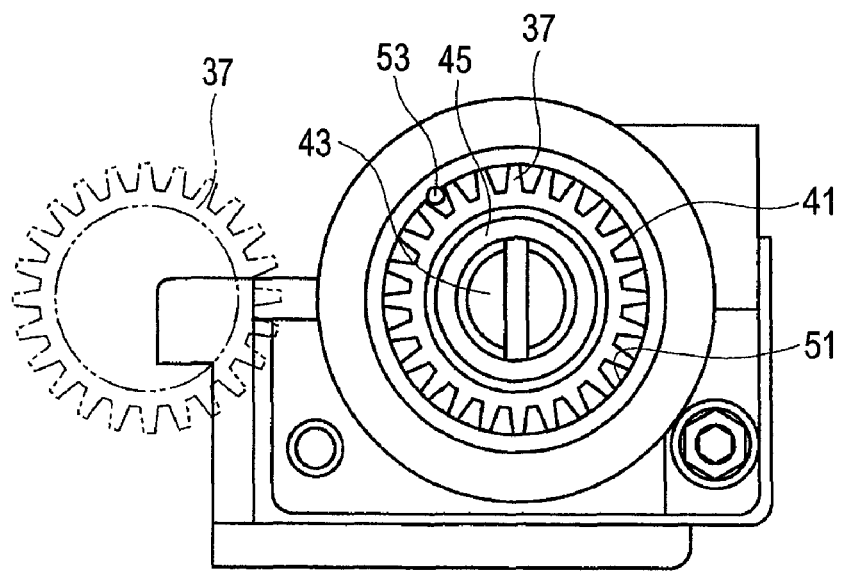
FIG. 8 is a view taken in the direction of arrow C shown in FIG. 7.

FIG. 7 is a plan view illustrating a primary part of a body of a third embodiment of the optical fiber cutting device 1B according to the present invention. FIG. 8 is a view taken in the direction of arrow C shown in FIG. 7.

The optical fiber cutting device 1B according to the third embodiment is an improvement of a structure for fixing the blade member 3 to the gear 37, which has been described in the description of the second embodiment. Other components of the third embodiment are the same as the corresponding components of the second embodiment. Like reference numerals designate like parts and places. The description thereof is omitted.

In the third embodiment, a circular counterbore 51, into which the gear 37 is fit so as to perform positioning thereof, and a rotation-stop pin 53, which projects to the gear 37 from the bottom surface of the counterbore 51, are provided in a flat part of a surface of the blade member 3. The circular counterbore 51 inhibits the gear 37 fit thereinto from moving in a direction perpendicular to the central axis of the gear 37.

The rotation-stop pin 53 is fit into between the teeth 4 of the gear 37 fit into the counterbore 51, as illustrated in FIG. 8, to thereby regulate the rotation of the gear 37 which is fit into the counterbore 51.

An adhesive agent is applied onto the contact surface between the gear 37 and the counterbore 51.

That is, in the case of the third embodiment, the gear 37 is fixed to and is integral with the blade member 3 due to the adhesion strength of the adhesive agent, a force caused by the counterbore 51 for regulating the position of the gear 37 in a direction perpendicular to the central axis of the gear 37, and an effect of stopping the rotation of the gear 37 by the engagement of the rotation-stop pin 53 with the teeth 41.

Figure 9:
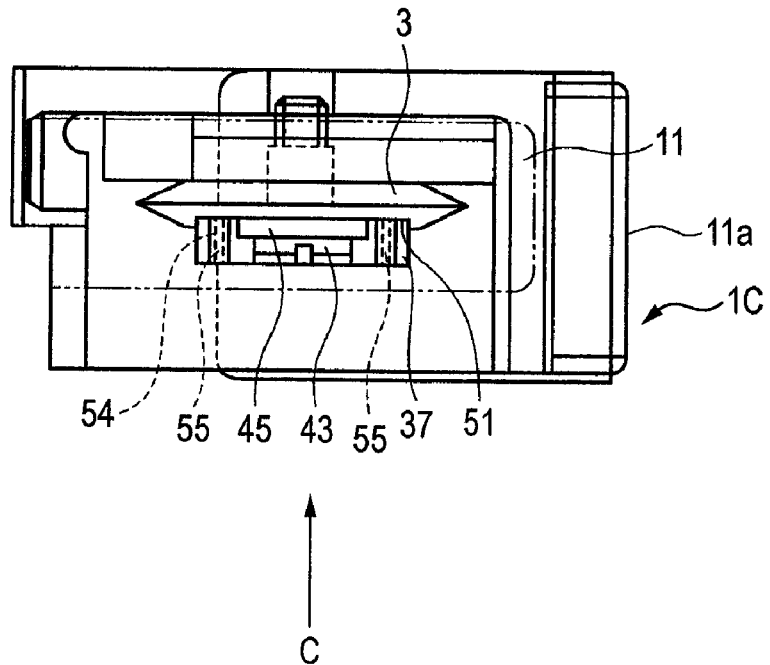
FIG. 9 is a plan view illustrating a primary part of a body of a fourth embodiment of the optical fiber cutting device according to the present invention.
Figure 10:
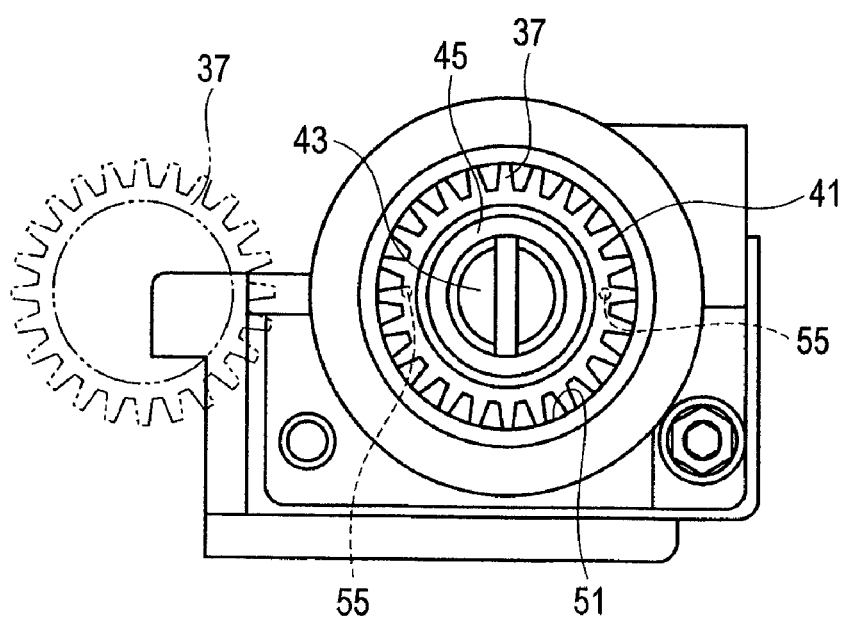
FIG. 10 is a view taken in the direction of arrow D shown in FIG. 9.

FIG. 9 is a plan view illustrating a primary part of a body of a fourth embodiment of the optical fiber cutting device according to the present invention. FIG. 10 is a view taken in the direction of arrow D shown in FIG. 9.

The optical fiber cutting device 1C according to the fourth embodiment is obtained by further improving a structure for fixing the blade member 3 to the gear 37, which has been described in the description of the third embodiment. Other components of the third embodiment are the same as the corresponding components of the second and third embodiments. Like reference numerals designate like parts and places. The description thereof is omitted.

In the fourth embodiment, a circular counterbore 51, into which the gear 37 is fit so as to perform positioning thereof, and a rotation-stop pin 54, which projects to the gear 37 from the bottom surface of the counterbore 51, are provided in a flat part of a surface of the blade member 3. The circular counterbore 51 inhibits the gear 37 fit thereinto from moving in a direction perpendicular to the central axis of the gear 37.

The rotation-stop pin 54 is fit into an engaging hole 55 provided in the gear 37 which is fit into the counterbore 51, as illustrated in FIGS. 9 and 10, to thereby regulate the rotation of the gear 37 which is fit into the counterbore 51.

An adhesive agent is applied onto the contact surface between the gear 37 and the counterbore 51.

That is, in the case of the fourth embodiment, the gear 37 is fixed to and is integral with the blade member 3 due to the adhesion strength of the adhesive agent, a force caused by the counterbore 51 for regulating the position of the gear 37 in a direction perpendicular to the central axis of the gear 37, and an effect of stopping the rotation of the gear 37 by the engagement of the rotation-stop pin 54 with the engaging hole 55.

Figure 11:
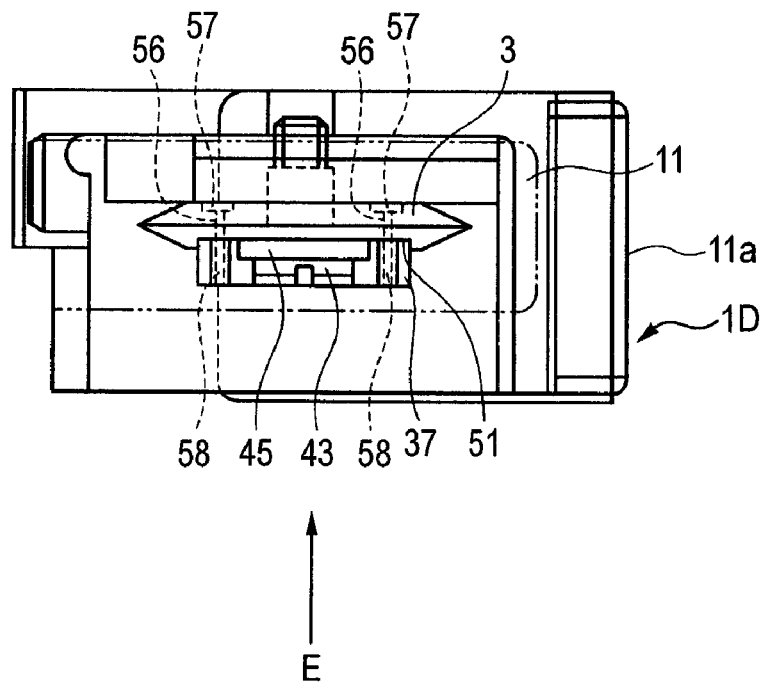
FIG. 11 is a plan view illustrating a primary part of a body of a fifth embodiment of the optical fiber cutting device according to the present invention.
Figure 12:
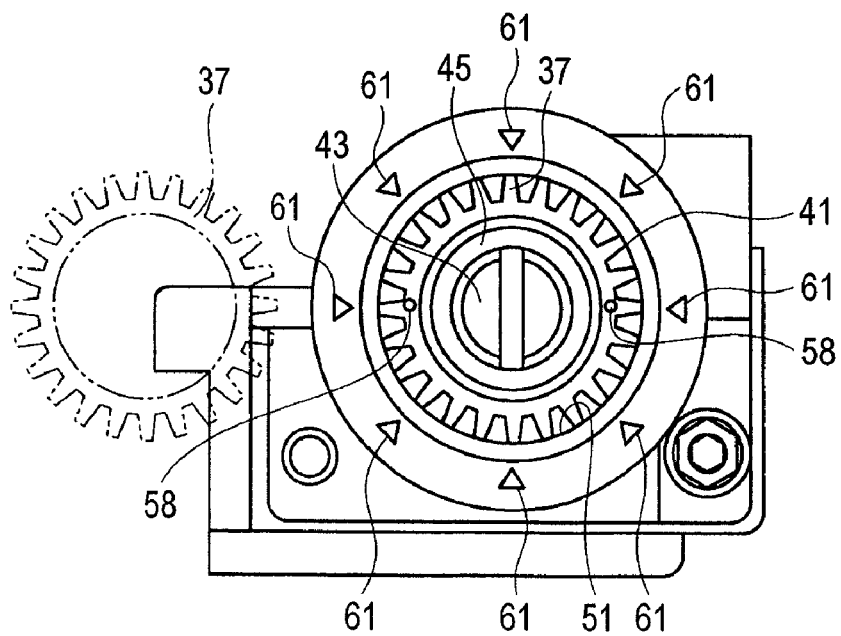
FIG. 12 is a view taken in the direction of arrow E shown in FIG. 11.

FIG. 11 is a plan view illustrating a primary part of a body of a fifth embodiment of the optical fiber cutting device according to the present invention. FIG. 12 is a view taken in the direction of arrow E shown in FIG. 11.

The optical fiber cutting device 1D according to the fifth embodiment is obtained by further improving a structure for fixing the blade member 3 to the gear 37, which has been described in the description of the third embodiment. Other components of the third embodiment are the same as the corresponding components of the second and third embodiments. Like reference numerals designate like parts and places. The description thereof is omitted.

In the fifth embodiment, a circular counterbore 51, into which the gear 37 is fit so as to perform positioning thereof, and a screw insertion hole 56 formed in the counter bore 51 to penetrate therethrough from the back surface side of the blade member 3. The circular counterbore 51 inhibits the gear 37 fit thereinto from moving in a direction perpendicular to the central axis of the gear 37.

A male screw 57 is passed through the screw insertion hole 56 from the rear surface side of the blade member 3. The male screw 57 is screwed into a female screw portion 58 which penetrates through the gear 37. Thus, the rotation of the gear 37 fit into the counterbore 51 is regulated.

That is, in the case of the fifth embodiment, the gear 37 is fixed to and is integral with the blade member 3 due to a force caused by the counterbore 51 for regulating the position of the gear 37 in a direction perpendicular to the central axis of the gear 37, and an effect of screwing the male screw 57 into the female screw portion 58.

In the fifth embodiment, the gear 37 can be closely attached to the bottom surface of the counterbore 51 by a fastening force of the male screw 57. Thus, reinforcement using an adhesive agent can be omitted.

Also, in the case of the fifth embodiment, as illustrated in FIG. 12, marks 61 enabling the visual check of the rotating state of the blade member 3 are provided at a plurality of places spaced in the circumferential direction of the blade member 3.

In the case of an example illustrated in FIG. 12, the marks 61 are provided at 8 places in a circumferential direction at uniform intervals (i.e., at intervals of 45 degrees on the circumference). However, the interval between the marks 61 is not limited thereto. It is advisable to set the interval at an appropriate value that is within a range, for example, from 20 degrees to 45 degrees.

With the configuration provided with the marks 61, at the rotation of the blade member 3 in synchronization with the movement operation thereof, the mark 61 provided on the blade member 3 moves with respect to a reference point (not shown) provided in the lower casing 5 (see FIG. 1). Thus, an operator can easily and visibly check whether the contact area of the blade member 3 is properly changed by the rotation thereof. This facilitates an operation of adjusting an amount of rotation of the blade member 3, which is performed in synchronization with the movement operation thereof. Additionally, for example, number symbols respectively representing numerical values arranged in the ascending or descending order are engraved thereon, instead of a triangular mark illustrated in FIG. 12. Consequently, a used amount or a remaining-amount of the blade member 3 can clearly be indicated.

While the present invention has been described with respect to a limited number of embodiments, those skilled in the art, having benefit of this disclosure, will appreciate that other embodiments can be devised which do not depart from the scope of the present invention as disclosed herein. Accordingly, the scope of the present invention should be limited only by the attached claims.

What is clamed is:

1. An optical fiber cutting device for cutting an optical fiber, comprising:
   a disk-shaped blade member which forms a flaw on a surface of a glass fiber part of the optical fiber by being moved toward the glass fiber part of the optical fiber; and
   a contact member fixedly provided halfway through a movement path of the blade member, wherein:
   a contact area between the blade member and the glass fiber part is changed by rotating the blade member in synchronization with a movement operation of the blade member,
   rotation of the blade member is implemented by a contact friction force which is generated by contact between the blade member and the contact member,
   the blade member includes a feed roller for receiving the contact friction force, and a one-way clutch for transmitting torque of the feed roller to the blade member only during rotation in one direction of the feed roller,
   the optical fiber cutting device further comprises a position adjusting mechanism which adjusts contact friction between the feed roller and the contact member, and
   the contact member is fixed through the position adjusting mechanism, and an amount of rotation of the blade member is changed by adjusting the position adjusting mechanism.

2. The optical fiber cutting device according to claim 1, further comprising:
   a cleaning means provided halfway through a movement path of the blade member.

3. The optical fiber cutting device according to claim 1, wherein the blade member reciprocates and rotates on a forward pathway, thereby changing the contact area, and the blade member forms a flaw on the glass fiber part on a backward pathway with the changed contact area.

4. The optical fiber cutting device according to claim 1, wherein the blade member includes a mark visibly checking a rotating state of the blade member.

5. An optical fiber cutting device for cutting an optical fiber, comprising:
   a disk-shaped blade member which forms a flaw on a surface of a glass fiber part of the optical fiber by being moved toward the glass fiber part of the optical fiber; and
   a contact member fixed provided halfway through a movement path of the blade member, wherein:
   a contact area between the blade member and the glass fiber part is changed by rotating the blade member in synchronization with a movement operation of the blade member,
   rotation of the blade member is implemented by a contact friction force which is generated by contact between the blade member and the contact member,
   the blade member includes a feed roller for receiving the contact friction force, and a one-way clutch for transmitting torque of the feed roller to the blade member only during rotation in one direction of the feed roller,
   the optical fiber cutting device further comprises a position adjusting mechanism which adjusts contact friction between the feed roller and the contact member, the contact member is fixed through the position adjusting mechanism, and an amount of rotation of the blade member is changed by adjusting the position adjusting mechanism, and the position adjusting mechanism is enabled to adjust a position of the contact member in three directions including a direction of an axis of rotation of the disk-shaped blade member, a direction of movement of the blade member, which is perpendicular to the axis of rotation of the blade member, and a direction perpendicular to both of the axis of rotation of the blade member and the direction of the movement operation of the blade member.

* * * * *